United States Patent [19]

Eckberg

[11] Patent Number: 4,990,546

[45] Date of Patent: Feb. 5, 1991

[54] UV-CURABLE SILPHENYLENE-CONTAINING EPOXY FUNCTIONAL SILICONES

[75] Inventor: Richard P. Eckberg, Saratoga Springs, N.Y.

[73] Assignee: General Electric Company, Waterford, N.Y.

[21] Appl. No.: 499,922

[22] Filed: Mar. 23, 1990

[51] Int. Cl.$^5$ .................. C09F 303/02; C08G 77/00; C08G 77/06; C08G 77/04

[52] U.S. Cl. ...................................... 522/170; 522/31; 528/13; 528/19; 528/25; 528/23; 528/43; 549/215

[58] Field of Search ............................ 522/99, 170, 31; 528/19, 13, 43, 25, 35; 549/215

[56] References Cited

U.S. PATENT DOCUMENTS 4,370,358  1/1983  Hayes et al. ..................... 522/99
4,861,901  8/1989  Lau et al. .

*Primary Examiner*—Marion C. McCamish
*Assistant Examiner*—Susan Berman

[57] ABSTRACT

Silphenylene groups are incorporated into epoxy-functional silicones to improve the physical properties of otherwise weak and brittle UV-cured epoxy-functional silicones without adding fillers and without sacrificing fast, efficient UV cure speed. Such compositions are useful as conformal coatings, optical fiber coatings, and electrical encapsulation.

24 Claims, No Drawings

UV-CURABLE SILPHENYLENE-CONTAINING EPOXY FUNCTIONAL SILICONES

BACKGROUND OF THE INVENTION

This invention relates to epoxy-functional organopolysiloxanes. More particularly, this invention relates to silarylene-containing epoxy-functional organopolysiloxanes and their use as conformal coatings.

UV-curable silicone compositions have become widely accepted as protective coatings for electronic components mounted on circuit boards. The moisture resistance, thermal stability and resistivity of silicones make them ideal for this purpose. The cure chemistry of radiation curable silicones is most often free-radical in nature, requiring a high flux of radicals generated by UV light radiation of photoinitiators.

A drawback to free-radical crosslinking processes is that such processes are subject to inhibition by atmospheric oxygen. The "oxygen effect" is particularly troublesome in oxygen-permeable silicone systems. Prompt cure response, therefore, is dependent on either efficient nitrogen blanketing to forestall oxygen cure inhibition or the use of amine-benzophenone-type synergist catalyst systems to overcome the oxygen effect.

Production ultraviolet facilities are not easily nor economically inerted, particularly if wide web converting or high speed processing is practiced. Furthermore, amine-benzophenone-type synergist catalyst systems, which are useful for overcoming oxygen inhibition in organic acrylate UV cure resins, are often insoluble in dimethyl silicone polymers. Fast non-inerted UV cure is achievable by combining mercapto- and acrylated-silicones with certain photosensitizers, but such systems are meta-stable and subject to shelf-life and pot-life limitations.

Currently, UV-curable silicone coatings useful for conformal coatings, optical fiber coatings, and electrical encapsulation contain silicon-bonded mercapto-olefin or acrylate radicals. Reference is made, for example, to U.S. Pat. Nos. 4,558,082; 4,585,669; 4,587,137; 4,496,210; and 4,780,486.

However, the use of mercapto-olefins or acrylates has several drawbacks. For example, acrylates are toxic and both acrylate monomers and mercaptans give off highly offensive odors which can persist in the cured products, and because of precautionary/safety measures entailed by their use, they are not easily adapted to industrial applications.

It is desirable therefore to provide conformal coatings and coatings for optical fibers and electrical encapsulation which are made from UV-curable silicone compositions which do not contain mercapto-olefin or acrylate functionality and which do not cure in a free-radical based crosslinking process.

Cationic (non-radical) UV cure processes are not affected by oxygen and are therefore well suited for high speed silicone coating and curing processes. Cationic UV cure of silicones has been found to be most practical with epoxy-functional silicones.

It would be desirable, therefore, to provide conformal coatings and coatings for optical fibers and electrical encapsulation which are made from UV-curable epoxy-functional silicone compositions.

Epoxysilicone compositions containing epoxy-functionalized silicone polymers and silicone miscible iodonium photocatalysts are presently used as release coatings.

High speed solventless silicone release processing requirements dictate that UV-curable epoxysilicone release compositions be limited to unfilled, low molecular weight, highly organofunctionalized polymers whose cured films are therefore brittle and easily abraded weak substances unsuited for other coating applications.

Conformal coatings are desired which are tough and have high tensile strength and high percents of elongation.

Accordingly, it was desirable to provide UV-curable epoxy-functional silicone coatings with improved film properties for use as conformal coatings and coatings for optical fibers and electrical encapsulation.

It was further desirable to provide epoxy-functional silicone coatings with improved film properties without using fillers. Fillers tend to block UV light which consequently slows down cure dramatically. Furthermore, it is difficult to incorporate fillers into low viscosity matrices such as epoxy-functional silicone polymers.

SUMMARY OF THE INVENTION

Accordingly, it is an object of the present invention to provide UV-curable epoxy-functional silicone coatings which combine non-oxygen inhibited fast UV cure with improved film properties for use as conformal coatings and coatings for optical fibers and electrical encapsulation.

It is a further object of the present invention to provide UV-curable epoxy-functional silicone coatings with improved film properties without using fillers.

These objects are achieved in the present invention.

The present invention provides an ultraviolet radiation-curable composition, comprising
(A) a silarylene-containing epoxy-functional diorganopolysiloxane having the general formula:

$$E-\underset{\underset{R}{|}}{\overset{\overset{R}{|}}{Si}}-R^1-\underset{\underset{R}{|}}{\overset{\overset{R}{|}}{Si}}-CH_2CH_2-\underset{\underset{R}{|}}{\overset{\overset{R}{|}}{Si}}-O-(SiO)_x-\underset{\underset{R}{|}}{\overset{\overset{R}{|}}{Si}}-$$

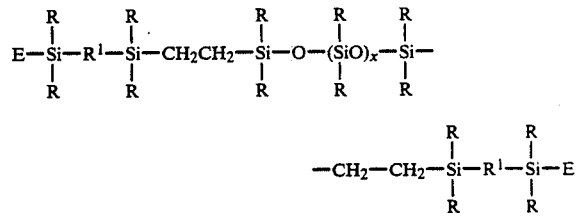

wherein E represents an epoxy-functional organic radical having from 2 to 20 carbon atoms; R is individually a lower alkyl radical having 1 to 8 carbon atoms; $R^1$ is a divalent aromatic organic radical having 6 to 14 carbon atoms; and x is a value of from 0 to about 100; and
(B) a catalytic amount of an onium salt photoinitiator or a combination of onium salt photoinitiators.

DETAILED DESCRIPTION OF THE INVENTION

The silarylene-containing epoxy-functional silicone composition used in the present invention is prepared by a stepwise process comprising (1) hydrosilation reaction of a stoichiometric excess of bis(diorganosilyl)arylene with a vinyl diorganosiloxy-stopped polydiorganosiloxane in the presence of a catalytic amount of a platinum catalyst, followed by (2) reaction of the product of step (1) with an epoxy, e.g., 4-vinylcyclohexeneoxide (VCHO), as illustrated below:

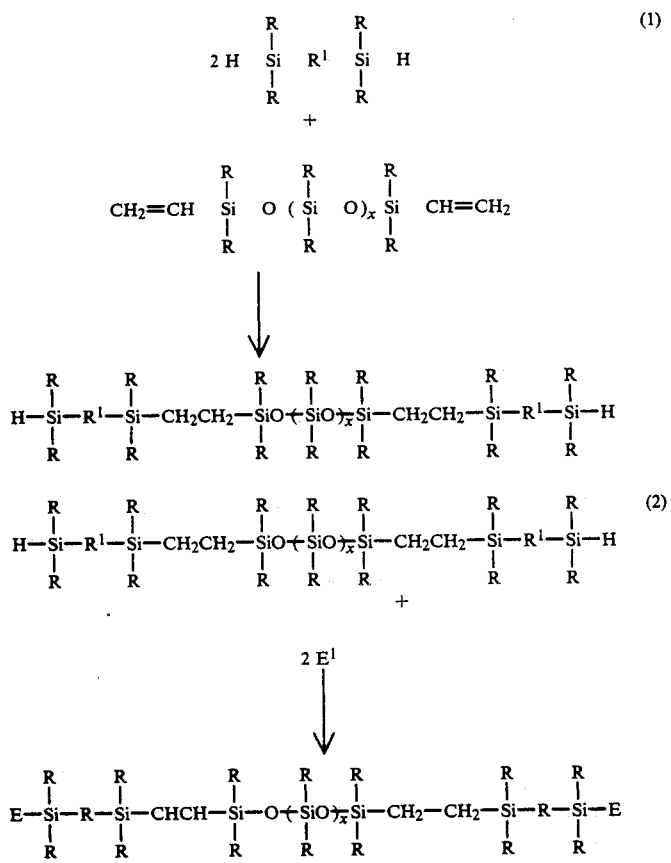

The product is an epoxy-stopped linear silicone polymer bearing silarylene and siloxane groups.

In the formulas above, R is a lower alkyl having 1 to about 8 carbon atoms, and preferably is a methyl group. $R^1$ is a divalent aromatic organic radical having 6 to about 14 carbon atoms, such as, for example, phenylene, tolylene, naphthalene, 4,4'-biphenylene, 4,4'-diphenylene ether, and the like; or a halogenated divalent aromatic hydrocarbon radical such as chlorophenylene, bromonaphthalene; and the like. Most preferably, $R^1$ is a phenylene group. x is a value of from about 0 to about 100, preferably about 0 to about 50, and most preferably about 10 to about 30. $E^1$ is an organic compound possessing both olefin and epoxy functionalities. E is an epoxy functional organic radical having from 2 to 20 carbon atoms. Most preferably, E is derived from 4-vinylcyclohexeneoxide and has the formula

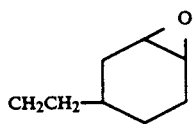

The preferred bis(diorganosilyl)arylene used in step (1) of the above process is para-bis(dimethylsilyl)benzene.

The vinyl functional siloxane used in step (1) of the process described above can be selected from the group consisting of dimethylvinyl chain-stopped linear polydimethylsiloxane, dimethylvinyl chain-stopped polydimethyl-methylvinyl siloxane copolymer, tetravinyltetramethylcyclotetrasiloxane and tetramethyldivinyldisiloxane. Preferably, the vinyl functional siloxane is sym-tetramethyldivinyldisiloxane or dimethylvinyl chain-stopped linear polydimethylsiloxane.

The catalyst used in step (1) of the process above is a platinum metal catalyst effective for adding hydrogen to the double bond of the vinyl group. Ordinarily, approximately 5 parts platinum metal per million parts of siloxane will be effective to promote this hydrosilation reaction. Examples are those exemplified in U.S. Pat. Nos. 3,220,972; 3,814,730; 3,775,452; and 3,715,334, each of which is herein incorporated by reference. Particularly useful are those platinum catalysts derived from chloroplatinic acid which has been treated with tetramethyldivinyldisiloxane, as described in U.S. Pat. No. 3,814,730 to Karstedt (hereinafter referred to as the "Karstedt catalyst"), which is herein incorporated by reference.

Suitable epoxy compounds for use in step (2) of the process above include olefinic epoxy monomers such as limoneneoxide, 4-vinylcyclohexeneoxide, allylglycidylether, 7-epoxy-1-octene, and the like. Because their cationic cure response is much faster than that of their glycidyl ether analogs, cycloaliphatic epoxides are preferred for use in the present invention. The preferred cycloaliphatic epoxide is 4-vinylcyclohexeneoxide.

Thus, in the most preferred embodiment of the present invention, the silarylene-containing epoxy-functional silicone of component (A) has the formula:

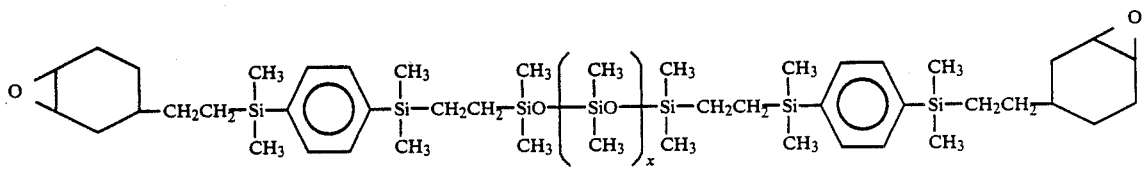

where X is about 10 to about 30

Component B of the composition of this invention is an onium salt photoinitiator or a combination of onium salt photoinitiators. Suitable photoinitiators are the onium salts having the formulae:

$R_2I^+MX_n^-$
$R_3S^+MX_n^-$
$R_3Se^+MX_n^-$
$R_4P^+MX_n^-$
$R_4N^+MX_n^-$ where radicals represented by R can be the same or different organic radicals from 1 to 30 carbon atoms, including aromatic carbocyclic radicals of from 6 to 20 carbon atoms which can be substituted with from 1 to 4 monovalent radicals selected from $C_{(1-8)}$ alkoxy, $C_{(1-8)}$ alkyl, nitro, chloro, bromo, cyano, carboxy, mercapto, and the like, and also including aromatic heterocyclic radicals including, e.g., pyridyl, thiophenyl, pyranyl, and the like; and $MX_n^-$ is a non-basic, non-nucleophilic anion, such as $BF_4^-$, $PF_6^-$, $AsF_6^-$, $SbF_6^-$, $SbCl_6^-$, $HSO_4^-$, $ClO_4^-$, and the like.

The preferred onium salts for use herein are the diaryliodonium salts. Examples of suitable diaryliodonium salts are disclosed, for example, in U.S. Pat. No. 4,882,201, which is incorporated herein by reference. The most preferred of these salts is that having the formula

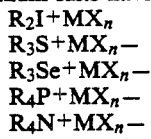

$SbF_6^-$

Specific examples of other suitable diaryl iodonium salts include bis(dodecyl phenyl)iodonium hexafluoroarsenate, and bis(dodecyl phenyl) iodonium hexafluoroantimonate. Most preferred of these iodonium salts is bis(dodecyl phenyl) iodonium hexafluoroantimonate.

The amount of catalyst present in the composition of this invention is not critical, so long as proper polymerization is effected. As with any catalyst, it is preferable to use the smallest effective amount possible, for the purposes herein, catalyst levels of from about 0.5%–5.0% by weight have been found suitable.

In order to obtain improved physical properties, the value of x in formula (I) for the silarylene-containing epoxy-functional silicone of the present invention can be as low as 0. Generally, x ranges from about 0 to about 100. Preferably, x is about 10 to about 50, and most preferably about 10 to about 30.

Another aspect of the present invention is directed to the method of making the UV curable compositions of the present invention. The curable compositions are prepared merely by combining the epoxy-functional silicone polymers and the onium salt photocatalysts described herein. The articles of the present invention are prepared by applying such composition to a substrate such as a circuit board if the composition is to be used as a conformal coating, thereafter exposing the coated substrate to ultraviolet radiation sufficient to set the composition, and finally allowing curing to be completed by exposing the article to either room temperature, elevated temperature, or to longer exposure to ultraviolet radiation.

A further aspect is directed to an article of manufacture, comprising a substrate having disposed on the surface thereof a coating containing the cured composition comprising components (A) and (B).

In order that those skilled in the art might be better able to practice the present invention, the following examples are given by way of illustration and not by way of limitation.

EXAMPLES

Example 1

18.6 g of sym-tetramethyldivinyldisiloxane (0.10 mole) were dispersed in 100 grams hexane in a 500 ml flask. 0.03g of Karstedt platinum catalyst (containing 5% active platinum) were added, and the agitating mixture warmed to 48° C. At this point a solution of 38.8 g para-bis (dimethylsilyl) benzene in 50 g hexane was slowly added dropwise. An exothermic reaction occurred, raising flask temperature to 55° C. With addition complete, the reaction mixture was maintained at 45° C. for an hour. Fourier Transform (i.e., computer-enhanced) infrared spectral (FTIR) analysis of the reaction mixture confirmed that this pre-reaction had taken place (the 1600 cm$^{-1}$ vinyl stretch was absent):

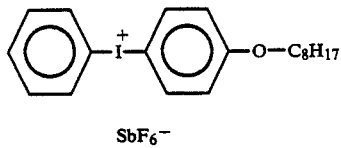

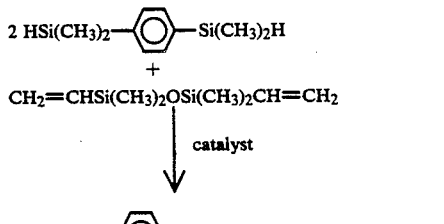

24.8 g 4-vinylcyclohexeneoxide (VCHO) was now added to the reaction mixture at 50° C. A second exothermic reaction was observed, following which FTIR analysis revealed loss of the strong SiH absorbence at 2200 cm$^{-1}$. The batch was then warmed to 100° C. under a strong nitrogen sweep to remove hexane and any unreacted VCHO. 78 grams of a 3850 cps. viscosity, measured on a Brookfield LVF #4 viscometer at 60 rpm, fluid product were ultimately recovered. This product had a refractive index at 25° C. ($N_D^{25}$) of 1.5192 and can be represented as:

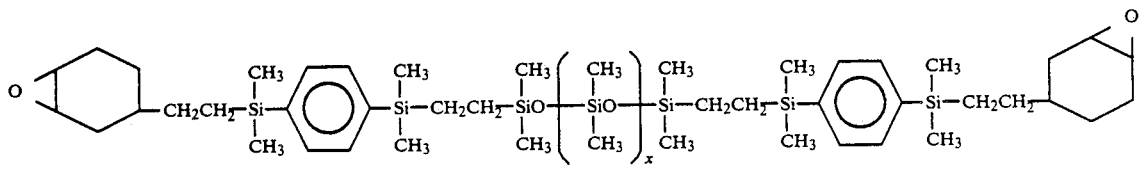

In this silphenylene-containing epoxy-functional silicone, the value of "x" as shown in formula (I), set forth previously herein, is 0.

COMPARATIVE EXAMPLE A

A reaction sequence precisely analogous to that described in Example 1 above was carried out, except that 26.8 grams sym-1,1,3,3-tetramethyldisiloxane (0.2 moles) were substituted for bis(dimethylsilyl)benzene. A 75 cstk viscosity fluid product was recovered, $N_D^{25} = 1.4538$, which can be represented as:

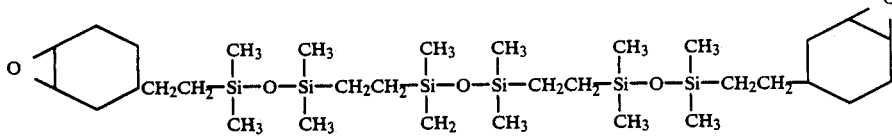

EXAMPLE 2

21.34 g of para-bis (dimethylsilyl) benzene (0.11 mole) were dispersed in 33g hexane in a 500 cc flask. A second solution was prepared consisting of 100 grams of dimethylvinylsiloxychainstopped polydimethylsiloxane containing 2.97 wt % - CH=CH₂ and having the approximate structure $$CH_2=CH-(CH_3)_2SiO(Si(CH_3)_2O)_{21}Si(CH_3)_2-CH=CH_2)$$

and 0.05 g Karstedt catalyst in 50 g hexane. The second solution was placed in a dropping funnel, then slowly added to the agitating first solution at 60° C. After holding at 60° C. for an hour, an FTIR spectrum of the reaction mixture was obtained which demonstrated that all of the vinyl present had reacted. VCHO was then added to react with the SiH present, as confirmed by the absence of the 2200 cm⁻¹ SiH stretch. Solvent was stripped off in vacuo to yield 128 grams of a 312 cstk fluid product, having $N_D^{25} = 1.4449$. Molecular structure of this material is represented as In this silphenylene-containing epoxy-functional silicone, the value of "x" as shown in formula (I), set forth previously herein, is 21.

COMPARATIVE EXAMPLE B

An epoxy-stopped linear polydimethylsiloxane of approximate structure

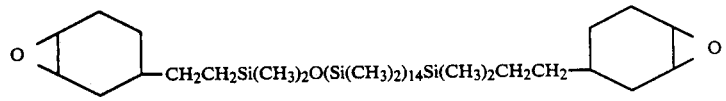

was produced via VCHO addition to a dimethylhydrogensiloxy-chainstopped dimethyl silicone fluid. This material was a 50 cstk fluid, $N_D^{25} = 1.4235$.

EXAMPLES 3 AND 4

Examples 1 and 2 were repeated using dymethylvinylsiloxystopped linear polydimethyl siloxanes having x values of 112 and 56, respectively. The physical properties of these materials are summarized in Table 1 below.

Ultraviolet cure response of the compositions prepared in the examples above was assessed in the following fashion: 1.0 wt % of a 50% wt/wt solution of 4 octyloxyphenylphenyliodoniumhexafluoroantimonate in 2-ethyl-1,3-hexanediol was mixed with each of the 4 compositions. 2 mil thick coatings of the photocatalyzed mixtures were manually applied to polyethylene kraft substrates, and the minimum ultraviolet light flux required to convert the liquid coatings to smearand migration-free solid surfaces ascertained by manipulation of lamp power and conveyer speed of an RPC model 1202QC Lab Processor unit (equipped with two Hanovia medium pressure mercury vapor UV lamps) into which the coated samples were placed. UV flux was measured with an International Light, Model 700A Research Photometer equipped with a Model A309 Lightbug accessory. Results are shown in Table 1 below.

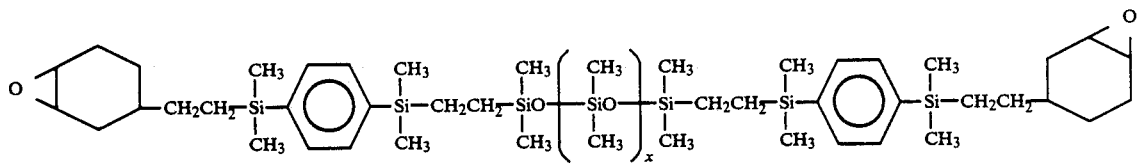

TABLE 1

| Example Number | $N^{25}_D$ | Viscosity | EEW* | UV Flux for 2 Mil Cure, mJ/cm² |
|---|---|---|---|---|
| 1 | 1.5192 | 3850 cps | 411 | 39 |
| Comp. A | 1.4538 | 75 cstk | 351 | 17 |
| 2 | 1.4449 | 312 cstk | 1202 | 233 |
| Comp. B | 1.4235 | 50 cstk | 717 | 105 |
| 3 | 1.4134 | 1800 cps | 8771 | >10,000 |
| 4 | 1.4203 | 637 cstk | 3367 | 1,500 |

These cure results are not surprising since slower cure (more UV power required) is normally observed as the epoxy equivalent weight increases and the crosslink density is diminished.

Thick slabs of the coating compositions prepared in Examples 1 and 2 and Comparative Examples A and B were prepared by weighing 15.0 grams of catalyzed baths into 12 cm - diameter shallow aluminum pans, then exposing the coating to @2.2 J/cm² focused UV light on the top side, removing the cured slabs from the mold, then exposing the tacky bottom sides to @1.1 J/cm² UV flux. Cured sections were about 50 mils thick.

Standard ASTM tensile bars were cut from the slabs, with peak tensile strength and elongation determined using an Instron testing device.

The phsyical property measurement results of these examples are listed in Table 2 below (averages of several determinations per sample).

TABLE 2

| Example No. | Tensile, psi | Elongation, % |
|---|---|---|
| 1 | 1485 | 12.5 |
| Comp. Example A | 67 | 5.4 |
| 2 | 217 | 24 |
| Comp. Example B | less than 5* | less than 5* |
| 3 | ** | ** |
| 4 | ** | ** |

*Specimens too fragile for accurate determination.
**UV cure efficiency and film physical properties could not be ascertained for Example 3, as no evidence of cure was obtained with 10 J/cm² UV flux on a 2 mil film. The composition for Example 4 cured to a tack-free 2 mil film on exposure to 1500 mJ/cm² UV flux (0.5 wt % (4-octyloxyphenyl) phenyliodoniumhexafluoroantimorate photocatalyst).
Thick sections of this material proved difficult to cure, so that the measured peak tensile of 75 psi at 60% elongation may be inaccurate due to undercured specimens.

Comparison of physical properties determined for Example 1 vs. Comparative Example A and for Example 2 vs. Comparative Example B demonstrates that inclusion of silphenylene in epoxysilicone systems dramatically improves cured film properties without unacceptable attenuation of cure rates.

The examples above indicate that the presence of silphenylene linkages in an epoxy functional siloxane greatly improves the physical properties of the polymers.

What is claimed is:

1. A UV radiation curable composition comprising
   (A) a silarylene-containing epoxy-functional diorganopolysiloxane having the general formula:

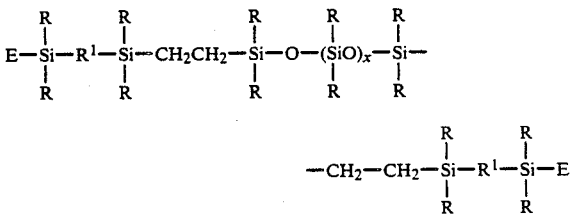

wherein E represents an epoxy-functional organic radical having from 2 to 20 carbon atoms; R is individually a lower alkyl radical having 1 to 8 carbon atoms; $R^1$ is a divalent aromatic organic radical having 6 to 14 carbon atoms; and x is a value of from 0 to about 100; and
   (B) a catalytic amount of a onium salt photocatalyst or a combination of onium salt photocatalysts.

2. The composition of claim 1 wherein R is a methyl group.

3. The composition of claim 1 wherein $R^1$ is a phenylene radical.

4. The composition of claim 1 wherein E has the formula

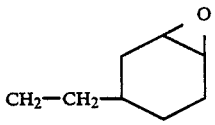

5. The composition of claim 1 wherein component (A) is a silphenylene-containing epoxy-functional dimethylpolysiloxane having the formula:

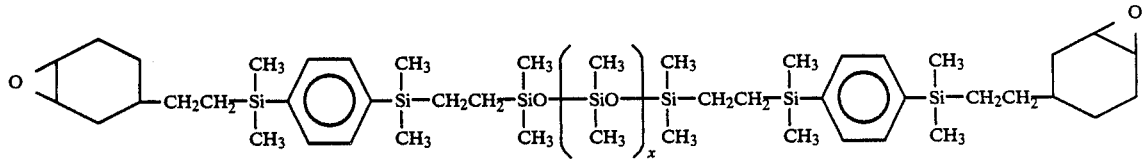

wherein x equals about 10 to about 30.

6. The composition of claim 1 wherein x is a number in the range of about 0 to about 50.

7. The composition of claim 6 wherein x is a number in the range of about 10 to about 30.

8. The composition of claim 1 wherein component (B) is present in an amount in the range of about 0.5% to about 5.0%.

9. The composition of claim 1 wherein component (B) is a diaryliodonium salt.

10. The composition of claim 9 wherein component (B) has the formula

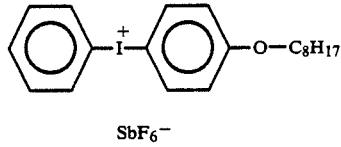

SbF₆⁻

11. The composition of claim 10 wherein component (B) is bis(dodecyl phenyl) iodonium hexafluoroantimonate.

12. A UV radiation curable composition comprising (A) a silphenylene-containing epoxy-functional dimethylpolysiloxane having the general formula:

$$O\!\!\begin{array}{c}\diagup\!\!\!\!\diagdown\\ \end{array}\!\!\!\!-CH_2CH_2-\underset{\underset{CH_3}{|}}{\overset{\overset{CH_3}{|}}{Si}}-\!\!\!\!\bigcirc\!\!\!\!-\underset{\underset{CH_3}{|}}{\overset{\overset{CH_3}{|}}{Si}}-CH_2CH_2-\underset{\underset{CH_3}{|}}{\overset{\overset{CH_3}{|}}{SiO}}\!\!\left[\underset{\underset{CH_3}{|}}{\overset{\overset{CH_3}{|}}{SiO}}\right]_x\!\!\underset{\underset{CH_3}{|}}{\overset{\overset{CH_3}{|}}{Si}}-CH_2CH_2-\underset{\underset{CH_3}{|}}{\overset{\overset{CH_3}{|}}{Si}}-\!\!\!\!\bigcirc\!\!\!\!-\underset{\underset{CH_3}{|}}{\overset{\overset{CH_3}{|}}{Si}}-CH_2CH_2-\!\!\!\!\begin{array}{c}\diagup\!\!\!\!\diagdown\\ \end{array}\!\!O$$

wherein x is about 10 to about 30

(B) about 0.5% to about 5.0% of bis(dodecyl phenyl)iodonium hexafluoroantimonate or a diaryliodonium salt having the formula:

$$\bigcirc\!\!-\overset{+}{I}-\!\!\bigcirc\!\!-O-C_8H_{17}$$

$$SbF_6^-$$

13. A method for making a UV-curable composition, comprising mixing
(A) a silarylene-containing epoxy-functional diorganopolysiloxane having the general formula:

$$E-\underset{\underset{R}{|}}{\overset{\overset{R}{|}}{Si}}-R^1-\underset{\underset{R}{|}}{\overset{\overset{R}{|}}{Si}}-CH_2CH_2-\underset{\underset{R}{|}}{\overset{\overset{R}{|}}{Si}}-O-(SiO)_x-\underset{\underset{R}{|}}{\overset{\overset{R}{|}}{Si}}-$$

$$-CH_2-CH_2-\underset{\underset{R}{|}}{\overset{\overset{R}{|}}{Si}}-R^1-\underset{\underset{R}{|}}{\overset{\overset{R}{|}}{Si}}-E$$

wherein E represents an epoxy-functional organic radical having 6 to 14 carbon atoms having from 2 to 20 carbon atoms., R is individually a lower alkyl radical having 1 to 8 carbon atoms; $R^1$ is a divalent aromatic organic radical; and x is a value of from 0 to about 100; and
(B) a catalytic amount of a onium salt photocatalyst or a combination of onium salt photocatalysts.

14. The method of claim 13 wherein R is a methyl group.

15. The method of claim 13 wherein $R^1$ is a phenylene radical.

16. The method of claim 13 wherein E is derived from 4-vinylcyclohexeneoxide and has the formula:

$$-CH_2-CH_2-\!\!\!\!\begin{array}{c}\diagup\!\!\!\!\diagdown\\ \end{array}\!\!O$$

17. The method of claim 13 wherein component (A) is a silphenylene-containing epoxy-functional dimethylpolysiloxane having the formula:

$$O\!\!\begin{array}{c}\diagup\!\!\!\!\diagdown\\ \end{array}\!\!\!\!-CH_2CH_2-\underset{\underset{CH_3}{|}}{\overset{\overset{CH_3}{|}}{Si}}-\!\!\!\!\bigcirc\!\!\!\!-\underset{\underset{CH_3}{|}}{\overset{\overset{CH_3}{|}}{Si}}-CH_2CH_2-\underset{\underset{CH_3}{|}}{\overset{\overset{CH_3}{|}}{SiO}}\!\!\left[\underset{\underset{CH_3}{|}}{\overset{\overset{CH_3}{|}}{SiO}}\right]_x\!\!\underset{\underset{CH_3}{|}}{\overset{\overset{CH_3}{|}}{Si}}-CH_2CH_2-\underset{\underset{CH_3}{|}}{\overset{\overset{CH_3}{|}}{Si}}-\!\!\!\!\bigcirc\!\!\!\!-\underset{\underset{CH_3}{|}}{\overset{\overset{CH_3}{|}}{Si}}-CH_2CH_2-\!\!\!\!\begin{array}{c}\diagup\!\!\!\!\diagdown\\ \end{array}\!\!O$$

wherein x is a number in the range of about 10 to about 30.

18. The method of claim 13 wherein x is a number in the range of about 0 to about 50.

19. The method of claim 18 wherein x is a number in the range of about 10 to about 30.

20. The method of claim 13 wherein component (B) is present in an amount in the range of about 0.5% to about 5.0%.

21. The method of claim 13 wherein component (B) is a diaryliodonium salt.

22. The method of claim 21 wherein component (B) has the formula $$\bigcirc\!\!-\overset{+}{I}-\!\!\bigcirc\!\!-O-C_8H_{17}$$

$$SbF_6^-$$

23. The method of claim 21 wherein component (B) is bis(dodecyl phenyl) iodonium hexafluoroantimonate.

24. A method for making a UV-curable composition, comprising mixing
(A) a silphenylene-containing epoxy-functional dimethylpolysiloxane having the general formula:

$$O\!\!\begin{array}{c}\diagup\!\!\!\!\diagdown\\ \end{array}\!\!\!\!-CH_2CH_2-\underset{\underset{CH_3}{|}}{\overset{\overset{CH_3}{|}}{Si}}-\!\!\!\!\bigcirc\!\!\!\!-\underset{\underset{CH_3}{|}}{\overset{\overset{CH_3}{|}}{Si}}-CH_2CH_2-\underset{\underset{CH_3}{|}}{\overset{\overset{CH_3}{|}}{SiO}}\!\!\left[\underset{\underset{CH_3}{|}}{\overset{\overset{CH_3}{|}}{SiO}}\right]_x\!\!\underset{\underset{CH_3}{|}}{\overset{\overset{CH_3}{|}}{Si}}-CH_2CH_2-\underset{\underset{CH_3}{|}}{\overset{\overset{CH_3}{|}}{Si}}-\!\!\!\!\bigcirc\!\!\!\!-\underset{\underset{CH_3}{|}}{\overset{\overset{CH_3}{|}}{Si}}-CH_2CH_2-\!\!\!\!\begin{array}{c}\diagup\!\!\!\!\diagdown\\ \end{array}\!\!O$$

wherein x is a number in the range of about 10 to about 30

(B) about 0.5% to about 5.0% of bis(dodecyl phenyl)iodonium hexafluoroantimonate or a diaryliodonium salt having the formula:
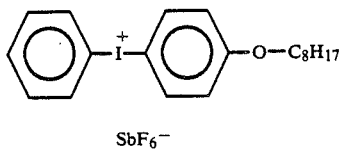
* * * * *